Figure 1:
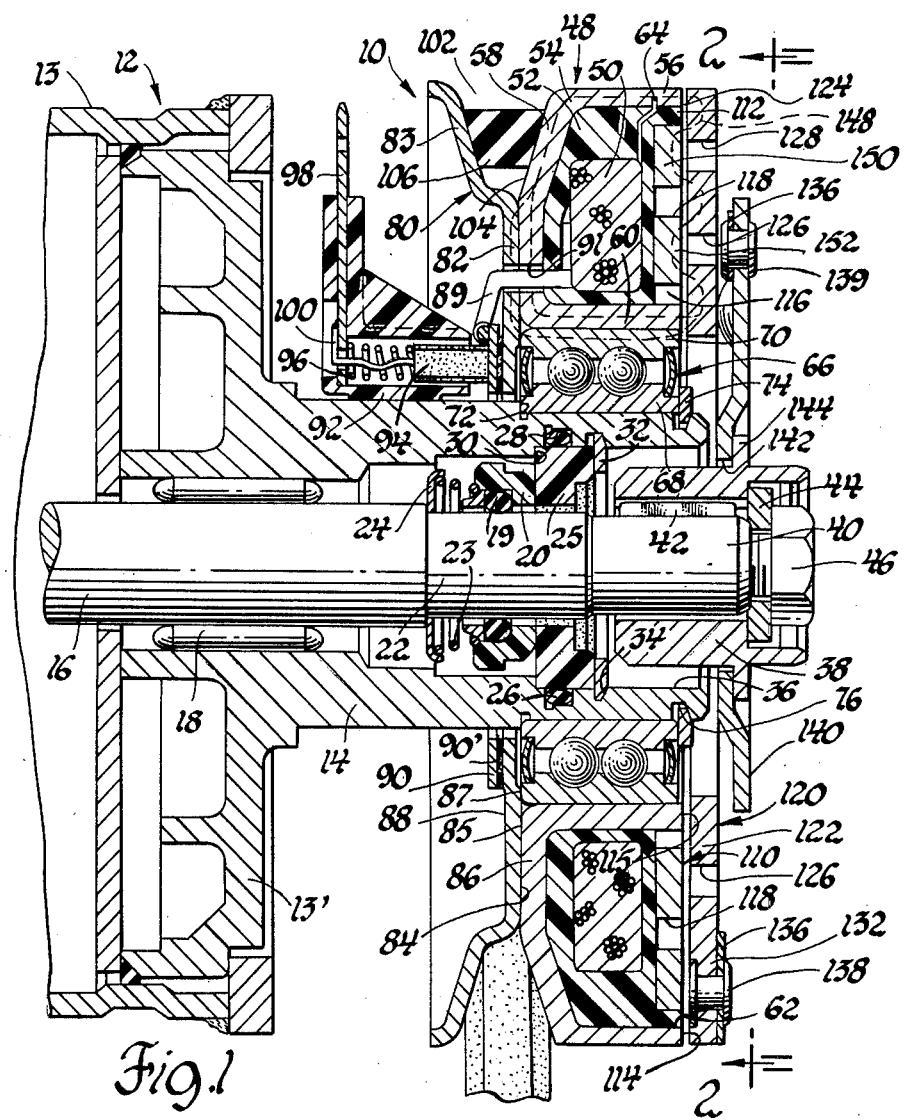

United States Patent [19]

Bennett et al.

[11] 4,257,508

[45] Mar. 24, 1981

[54] ELECTROMAGNETIC ROTATING COIL CLUTCH

[75] Inventors: George T. Bennett, Kettering; Byron L. Brucken, Miamisburg, both of Ohio

[73] Assignee: General Motors Corporation, Detroit, Mich.

[21] Appl. No.: 66,615

[22] Filed: Aug. 15, 1979

[51] Int. Cl.³ .......................................... F16D 27/06
[52] U.S. Cl. ................................ 192/84 A; 192/84 B
[58] Field of Search .............. 192/84 A, 84 B, 84 R, 192/106.1; 29/106.1

[56] References Cited

U.S. PATENT DOCUMENTS

| | | | |
|---|---|---|---|
| 2,739,683 | 3/1956 | Gamundi | 192/84 A |
| 2,982,385 | 5/1961 | Gamundi | 192/84 A |
| 3,162,285 | 12/1964 | Sala | 192/84 A |
| 3,384,213 | 5/1968 | Bernard et al. | 192/84 |
| 3,530,416 | 9/1970 | Klinkenburg | 335/281 |
| 3,703,227 | 11/1972 | Murakami et al. | 192/84 C |
| 4,190,141 | 2/1980 | Bennett et al. | 192/84 C |

FOREIGN PATENT DOCUMENTS

| | | | |
|---|---|---|---|
| 644016 | 7/1962 | Canada | 192/84 R |
| 698146 | 11/1964 | Canada | 192/84 A |

Primary Examiner—Rodney H. Bonck
Attorney, Agent, or Firm—Edward P. Barthel

[57] ABSTRACT

A lightweight electromagnetic clutch adaptable for use with an air conditioning compressor including a rotatable electromagnetic coil and pulley assembly and an armature plate forming part of a magnetic flux circuit. An annular dish-shaped member is joined in back-to-back relation with a rotatable coil housing to provide a unitary flux carrying driven structure with the radially outer portion of each defining a driven pulley belt receiving groove. The radially inner portion of the dish-shaped member together with the coil housing inner wall and a support casing fixed tubular extension define a bearing cavity wherein the dish-shaped member and the bearing provide, with the housing, composite flux paths for the magnetic circuit.

3 Claims, 2 Drawing Figures

ELECTROMAGNETIC ROTATING COIL CLUTCH

This invention relates generally to electromagnetic clutches and, more particularly, to an improved rotating coil electromagnetic clutch for use with vehicular air conditioning compressors.

As automobile air conditioners have become an ever increasing option, their continued use with newer, lighter vehicles makes it imperative that the weight of the air conditioning system be reduced to an absolute minimum. The present inventors' co-pending U.S. patent application Ser. No. 912,427, now U.S. Pat. No. 4,190,141, discloses an electromagnetic clutch for use with an air conditioning compressor including a rotating coil and pulley assembly wherein no shorting of the lines of flux can occur from the end portion of the coil housing outer wall to the clutch rotor resulting in its armature plate being attracted more quickly with stronger magnetic force when the coil is energized.

It is an object of the present invention to provide an improved reduced weight electromagnetic rotating coil clutch including an annular one-piece rotatable coil housing member defined by walls C-shaped in cross section forming one-half of a driven means for the compressor. An annular one-piece rotatable member, dish-shaped in cross section, has a wall thickness thinner than the wall thickness of the coil housing to form the other half of the driven means. Upon the two rotatable members being joined in back-to-back relationship a unitary flux carrying driven means is attained wherein the radially outer portions of each define a driven groove portion and the radially inner portion of the dish-shaped member is axially slidably received on a tubular extension of a support casing to define a bearing cavity with the coil housing and tubular extension. A slip ring is mounted on the opposite side of the dish-shaped member from the bearing cavity.

Another object of the present invention is to provide an improved rotating coil electromagnetic clutch as set forth in the above object, wherein a journal bearing in the bearing cavity includes relatively rotatable coaxial inner and outer concentric races with the inner race mounted around the tubular extension and the outer race supporting the coil housing and stopped against the radially inner portion of the dish-shaped member to form a corner juncture flux path. The inner wall of the coil housing and the outer race of the bearing provide a composite, axially extending magnetic flux path. Thus, the back-to-back arrangement of the rotatable driven means provides a composite radially extending magnetic flux path such that the combined axial, radial and corner juncture flux paths establish, with the armature plate, a magnetic flux circuit of increased force upon the energization of the rotating coil. The invention allows the clutch to be fabricated with a minimum of material thereby achieving a lightweight, readily assembled electromagnetic rotating coil clutch.

Figure 2:
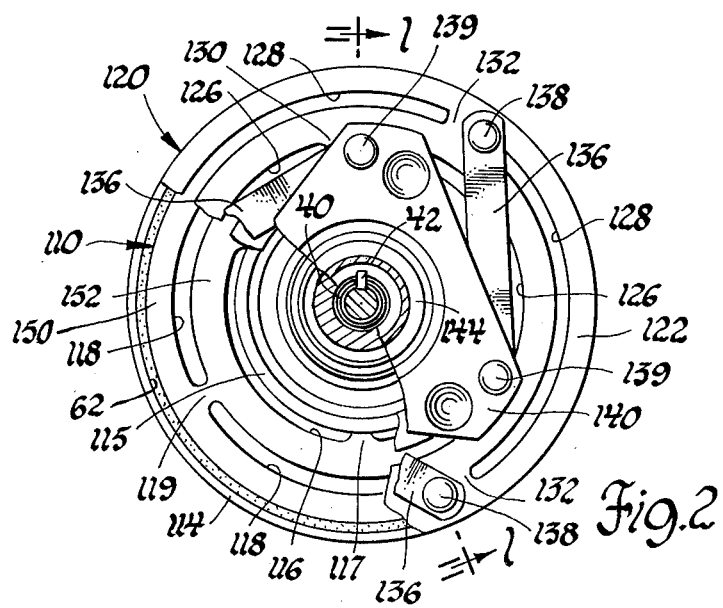

These and other objects and advantages of the present invention will be apparent when the following description is read with the accompanying drawings, wherein:

FIG. 1 is a cross-sectional view illustrating an electromagnetic clutch embodying the invention; and FIG. 2 is a cross-sectional view with parts broken away taken on line 2—2 of FIG. 1.

Referring now to the drawing in greater detail, there is illustrated in FIG. 1 an electromagnetic clutch 10 suitable for driving an automotive air conditioning compressor 12 including a housing or casing 13, on the forward or front head 13' end of which is formed a fixed tubular extension 14. An input or drive shaft 16 for driving the compressor 12 is rotatably mounted within needle bearing 18 and extends outwardly through the center of the tubular extension 14. A suitable shaft seal 19, including a rotating part 20, is mounted around a reduced intermediate portion 22 of the drive shaft 16 to prevent leakage therepast. A coil spring 23 is mounted between a suitable retainer 24 abutted against the shoulder between the shaft portions 16 and 22 and the rotating part 20 of the shaft seal 19, to urge the latter into engagement with a stationary seal ring 25. The latter is sealed within the tubular extension 14 by an 0-ring type seal ring 26 mounted in a first groove 28 formed in the inner peripheral surface of the tubular extension 14. The seal ring 25 is confined axially between a shoulder 30, formed within the tubular extension 14, and a split locking ring 32 mounted in a second groove 34 formed in the inner peripheral surface of the tubular extension 14. The inner bore of the tubular extension is enlarged at 36 to facilitate assembly and removal of the locking ring 32, the stationary seal ring 25 and the rotating part of the shaft seal 20.

The enlarged inner bore 36 of the tubular extension 14 provides space for the accommodation of the greater portion of a drive hub 38 which is mounted upon a reduced end portion 40 of the input shaft 16. The drive hub 38 is keyed to the shaft end portion 40 by a suitable key 42 and is retained thereon by a washer 44 and a bolt 46 threadably mounted in a threaded opening formed in the end of the end portion 40.

A coil assembly 48 includes an annular electromagnetic coil 50, of a predetermined number of turns embedded with a suitable potting compound 52, such as epoxy or nylon, or polyester resin, which is cast within an annular coil housing 54, the latter being formed of a paramagnetic material, such as steel or malleable iron. The coil housing 54 includes a radially outer wall 56, a closed end wall or side wall 58 adjacent the casing 13, a radially inner wall 60 spaced a predetermined distance apart from the coil 50, and an originally open end 62 opposite the closed end wall 58. The ground side of the coil 50 is attached via a connector element 64 to the housing wall 56 before the potting compound is added.

A journal bearing 66, including relatively rotatable coaxial inner and outer concentric races 68 and 70, respectively, is mounted between the tubular extension 14 and the inner wall 60 of the coil housing 54 with the inner race 68 mounted around the tubular extension. The coil housing 54 is rotatably supported on the bearing 66 with the housing inner wall 60 being in press-fit substantially coextension relation with the outer race 70. The inner race 68 is retained in place on the tubular extension 14 between a shoulder 72 formed on the latter and a split locking ring 74 mounted in a groove 76 formed in the outer surface of the tubular extension adjacent the end thereof.

The outer bearing race 70 is stopped against a radially inner base portion of a dish-shaped plate member 80 shown fitted over the tubular extension 14. As seen in the drawing the dish-shaped plate member 80 includes an inner radially extending base portion 82 and a peripheral rim portion 83. The housing inner wall 60 and the bearing outer race 70 provide a composite axially extending magnetic flux path. The plate base portion has one face 84 suitably secured in abutting, flush relation with the exterior surface 85 of radially extending side wall portion 86 of the housing. By virtue of this arrangement the housing side wall radially extending portion 86 and the coextensive plate portion 82 provide a composite radially extending magnetic flux path. It will be noted that the plate base portion extends radially inwardly a predetermined distance beyond the housing inner wall 60 such that the bearing outer race 70 one end 87 is located in abutting, flush contact with the plate base portion one face 84 defining a corner juncture magnetic flux path therebetween.

A slip ring 90 is shown mounted on the plate member 80 for rotation therewith by being suitably secured by means of an electrical insulating adhesive 90' to the plate base other or rearwardly directed face 88. A wire lead 89 is connected between the slip ring 90 and the electromagnetic coil 50 via an opening 91 formed through the housing side wall. A single brush holder 92 is secured to the tubular extension 14, and a brush 94 is mounted in the brush holder and urged by a coil spring 96 into sliding engagement with the slip ring 90. An electrical connector 98 is mounted in the brush holder 92 and connected to the brush 94 via a lead wire 100 extending axially through the coil spring 96.

It will be seen that the dish-shaped plate member peripheral rim portion 83 is formed at a predetermined angle to define a driven pulley belt receiving groove 102 in cooperation with outer beveled portion 104 of the housing side wall. The groove 102 supports a drive member such as a drive belt 106.

An annular radially extending pole member or clutch rotor 110 is secured to the rear end portion of the inner coil housing wall 60 in the open end 62 of the coil housing 54 and spaced at its outer edge a predetermined annular space or gap 112 width away from the inner surface of the outer coil housing wall 56, aligned with the free end faces 114, 115 of the walls 56 and 60, respectively.

As best seen in FIG. 2 a plurality of circumferentially spaced, concentric arcuate inner slots 116 are formed in the clutch rotor 110 providing spaced bridging elements 117 at the radially inner peripheral edge thereof, adjacent the inner coil housing wall 60.

It will be noted in FIG. 2 that a plurality of circumferentially spaced, concentric arcuate rotor slots 118 are formed in the rotor 110 including spaced rotor bridging elements 119.

With reference to FIG. 1 an armature plate-driven plate assembly 120 is shown mounted on the drive hub 38, the assembly 120 including an armature plate 122, shown in a deenergized position adjacent the outer face of the pole member or rotor 110, there being a variable width, radially extending gap or space 112 therebetween. FIGS. 1 and 2 show a plurality of conventional circumferentially spaced, concentric arcuate inner 126 and outer 128 slots formed in the armature plate 122 providing spaced bridging elements 130 and 132 respectively. It will be seen that the rotor slots 118 and bridging elements 119 are radially intermediate the armature plate inner and outer slots 126 and 128. The above-described slot arrangement together with the outer annular gap 112 and the inner rotor slots 116 provide a 6-pole magnetic flux path.

The armature plate 122 is retained adjacent the rotor 110 by a plurality of leaf springs 136, each of which is secured by rivets 138 and 139 at opposite ends thereof to the armature plate 122 and to a support member or drive plate 140, respectively. The drive plate 140 is secured adjacent a central opening 142 formed therein to the other end of the drive hub 38, abutted against flange 144, formed on the latter.

OPERATION

In operation, the clutch 10 is engaged by the energization of the electromagnetic coil 50 via the conductor 98, the wire lead 100, the brush 94, the slip ring 90, and the wire lead 89. Such energization of the coil causes the magnetic flux to travel a path through the adjacent paramagnetic material, i.e., from the composite closed end wall 86 and base 82 portions, the outer beveled wall portion 104, to the adjacent outer wall 56 of the coil housing, and, thence, traversing a serpentine path through the 6-pole clutch field resulting from the spaced relationship of the alternately located cooperating outer annular gap 112 and arcuate slots 128, 118, 126 and 116 is indicated by the dashed line 148. More specifically, the flux travels from the end of the outer coil housing wall directly across to the armature plate 122, thence to the pole member 150 and back again to the armature plate 122 on the radially inner side of the arcuate slots 128, and then to the pole member 152 and back again to the armature plate 122 on the radially inner side of the arcuate slots 126, and then concurrently to both the inner coil housing wall 60 and bearing outer race 70.

It will be noted that the portion of the flux path 148 traversing the bearing outer race 70 travels to the composite closed end wall 86 and base 82 portions via a corner juncture flux path established by the abutting flush contact of the outer bearing race one end 87 with the plate base portion one face 84. The flux returns to composite closed end wall 86 and base 82 portions to complete the circuit. As a result, the gap 124 between the plane formed by (1) the end face 114 of the outer coil housing wall 56, (2) the radially aligned pole members 150 and 152 and (3) the end face 115 of the inner coil housing end wall on the one side and the plane of the face of the armature plate 122 on the other side is closed as the armature plate 122 is pulled to the left in FIG. 1 against the force of the leaf spring members 136. Upon engagement of the armature plate, the drive hub 38 and the input shaft 16 are caused to rotate to drive the air conditioning compressor 12.

While the embodiment of the present invention as herein disclosed constitutes a preferred form, it is to be understood that other forms might be adopted.

The embodiments of the invention in which an exclusive property or privilege is claimed are defined as follows:

1. For use with a casing having a fixed tubular extension extending from an end surface thereof and a drive shaft extending centrally through said tubular extension, a readily assembled, electromagnetic clutch of reduced weight comprising an annular one-piece rotatable coil housing member defined by walls C-shaped in cross-section and opening away from said casing to form one-half of a driven means, an annular one-piece rotatable member dish-shaped in cross-section and having a wall thickness thinner than the wall thickness of said coil housing to form the other half of said driven means, said two rotatable members being joined in back-to-back relationship to make said driven means unitary so that the radially outer portions of each define a driven groove portion and the radially inner portion of said dish-shaped member is axially slidably received on said tubular extension to define a bearing cavity with said coil housing and said tubular extension and a support for a slip ring mounted on the opposite side thereof from said bearing cavity, a spring-loaded brush in fixed relation to said casing adjacent said slip ring, an energizable electromagnetic coil mounted in said coil housing through the opening thereof, drive means connected to said drive shaft, an armature plate positioned adjacent said drive means, means for axially movably supporting said armature plate with respect to said drive means and for drivingly interconnecting said armature plate with said drive means, a journal bearing in said bearing cavity including relatively rotatable coaxial inner and outer concentric races, said inner race mounted around said tubular extension with said outer race supporting said coil housing and stopped against the radially inner portion of said dish-shaped member to form a corner juncture flux path so that the inner wall of said coil housing and the outer race of said bearing provide composite axially extending magnetic flux paths, the back-to-back jointure of said two rotatable members providing a composite radially extending magnetic flux path, so that the combined axial, radial and corner juncture flux paths establish a magnetic flux circuit of increased force with said armature plate upon the energization of said coil, thereby to enable said coil housing to be formed of minimal material resulting in a lightweight, readily assembled, electromagnetic rotating coil clutch.

2. For use with a casing having a fixed tubular extension extending from an end surface thereof and a drive shaft extending centrally through said tubular extension, a readily assembled, electromagnetic clutch of reduced weight comprising an annular one-piece rotatable coil housing member defined by walls C-shaped in cross-section and opening away from said casing to form one-half of a driven means, an annular one-piece rotatable member dish-shaped in cross-section and having a wall thickness thinner than the wall thickness of said coil housing to form the other half of said driven means, said two rotatable members being joined in back-to-back relationship to make said driven means unitary so that the radially outer portions of each define a driven groove portion and the radially inner portion of said dish-shaped member is axially slidably received on said tubular extension to define a bearing cavity with said coil housing and said tubular extension and a support for a slip ring mounted on the opposite side thereof from said bearing cavity, a spring-loaded brush in fixed relation to said casing adjacent said slip ring, an energizable electromagnetic coil mounted in said coil housing through the opening thereof, drive means connected to said drive shaft, an armature plate positioned adjacent said drive means, a clutch rotor secured to said coil housing adjacent said armature plate, said clutch rotor and said armature plate having staggered pairs of arcuate slots for forming magnetic poles with said coil housing upon energization of said coil, means for axially movably supporting said armature plate with respect to said drive means and for drivingly interconnecting said armature plate with said drive means, a journal bearing in said bearing cavity including relatively rotatable coaxial inner and outer concentric races, said inner race mounted around said tubular extension with said outer race supporting said coil housing and stopped against the radially inner portion of said dish-shaped member to form a corner juncture flux path so that the inner wall of said coil housing and the outer race of said bearing provide composite axially extending magnetic flux paths, the back-to-back jointure of said two rotatable members providing a composite radially extending magnetic flux path, so that the combined axial, radial and corner juncture flux paths establish a magnetic flux circuit of 6-poles with said armature plate upon the engergization of said coil, thereby to enable said coil housing to be formed of minimal material resulting in a lightweight, readily assembled, electromagnetic rotating coil clutch.

3. For use with an air conditioning compressor including a casing having a fixed tubular extension extending from an end surface thereof and a drive shaft extending centrally through said tubular extension, with a drive hub secured to said drive shaft, an electromagnetic clutch comprising a one-piece rotatable coil housing having inner and outer walls, a side wall adjacent said casing and an open end facing away from said casing, said side wall including an inner radially extending portion and an outer beveled portion, means for securing a brush holder to said compressor, an energizable electromagnetic coil mounted in said coil housing, a spring-loaded brush mounted in said brush holder, drive means secured to said drive hub, an armature plate positioned adjacent said drive means on the coil side thereof, spring means secured at one end thereof to said armature plate and at the other end thereof to said drive means for movably supporting said armature plate and drivingly connecting said armature plate to said drive means, a journal bearing including relatively rotatable coaxial inner and outer concentric races, said inner race mounted around said tubular extension, said coil housing rotatably supported on said bearing with said housing inner wall being in press-fit substantially coextensive relation with said outer race whereby said housing inner wall and said bearing outer race provide a composite axially extending magnetic flux path, a dish-shaped plate member fitted over said tubular extension including an inner radially extending base portion and a peripheral rim portion, a slip ring mounted on said plate member for sliding engagement with said spring-loaded brush, said rim portion formed at a predetermined angle to define a driven pulley belt receiving groove in cooperation with said side wall beveled portion, said plate base portion having one face thereof secured in abutting, flush relation with the exterior surface of said housing radially extending side wall portion whereby said housing side wall radially extending portion and the coextensive plate base portion provide a composite radially extending magnetic flux path, said base portion extending radially inwardly a predetermined distance beyond said housing inner wall such that said bearing outer race one end is located in abutting, flush contact with said plate base portion one face defining a corner juncture magnetic flux path therebetween, whereby said axial and said radial flux paths in combination with said corner juncture flux path, said housing side wall beveled portion and outer wall portion establish a magnetic flux circuit with said armature plate upon the energization of said coil, enabling said coil housing to be formed of minimal material thereby providing a lightweight, readily assembled magnetic rotating coil clutch.

* * * * *